(12) United States Patent
Hughes (10) Patent No.: US 8,739,507 B2
(45) Date of Patent: Jun. 3, 2014

(54) INTERLOCKING CABLE TRACK SYSTEM

(71) Applicant: Ceiriog Hughes, Meadowlands, PA (US)

(72) Inventor: Ceiriog Hughes, Meadowlands, PA (US)

( * ) Notice: Subject to any disclaimer, the term of this patent is extended or adjusted under 35 U.S.C. 154(b) by 0 days.

(21) Appl. No.: 13/623,972

(22) Filed: Sep. 21, 2012

(65) Prior Publication Data

US 2014/0083075 A1 Mar. 27, 2014

(51) Int. Cl.
*F16G 13/16* (2006.01)

(52) U.S. Cl.
USPC .............. 59/78.1; 59/93; 59/900; 248/49; 248/51

(58) Field of Classification Search
USPC ................ 59/78.1, 93, 900; 248/49, 51
See application file for complete search history.

(56) References Cited

U.S. PATENT DOCUMENTS

| | | | |
|---|---|---|---|
| 3,367,718 A | 2/1968 | Hauschopp | |
| 3,861,751 A | 1/1975 | Erwien | |
| 3,997,039 A | 12/1976 | Hubbard et al. | |
| 4,103,974 A | 8/1978 | Nowacki et al. | |
| 4,119,348 A | 10/1978 | Curtis | |
| 4,185,874 A | 1/1980 | Beckmann | |
| 4,391,471 A | 7/1983 | Hauschopp et al. | |
| 4,458,950 A | 7/1984 | Schwarting et al. | |
| 4,483,567 A | 11/1984 | Schwarting | |
| 4,514,011 A | 4/1985 | Lodwig et al. | |
| 4,545,621 A | 10/1985 | Sharp | |
| 4,564,241 A | 1/1986 | Holz et al. | |
| 4,852,342 A * | 8/1989 | Hart | 59/78.1 |
| 5,027,595 A * | 7/1991 | Hart | 59/78.1 |
| 5,243,814 A * | 9/1993 | Hart | 59/78.1 |
| 5,497,536 A * | 3/1996 | Hart | 248/74.1 |
| 5,642,612 A | 7/1997 | Hughes | |
| 5,829,243 A | 11/1998 | Hughes | |
| 6,789,383 B1 | 9/2004 | Plush et al. | |
| 2002/0043591 A1 | 4/2002 | Sakai et al. | |
| 2008/0060339 A1 | 3/2008 | Howard | |
| 2008/0264032 A1 | 10/2008 | Kitagawa et al. | |

OTHER PUBLICATIONS

Mansign "Side Pull" Nylon Cable Handler, Copyright 2011, Mansign Mining Equipment Ltd.*

* cited by examiner

*Primary Examiner* — David B Jones
(74) *Attorney, Agent, or Firm* — The Webb Law Firm (57) ABSTRACT

A convertible interlocking cable track system for receiving and handling a flexible member for use in a longwall mining operation. The cable track system includes a series of links adapted to retain the flexible member, each of the links including a single pull link adapted to interconnect with adjacent links, wherein the single pull link is configured to cooperate with a cable control member to form an opening for receiving and handling the flexible member. The cable control member comprises either a shaped rod to form a single pull cable track system, or an outer link to convert the single pull link to a twin pull link in order to satisfy certain loading requirements. The cable track system also includes a securing arrangement for securing the cable control member to the single pull link and an interlocking system for joining the series of links to one another.

22 Claims, 8 Drawing Sheets

INTERLOCKING CABLE TRACK SYSTEM

BACKGROUND OF THE INVENTION

1. Field of the Invention

The present invention is directed to an interlocking cable track system for receiving and handling flexible members, such as an electrical cable and water hose for use in longwall mining operations, and more particularly, to an interlocking cable track system that can be converted from a single pull cable track system to a twin pull cable track system.

2. Description of Related Art

Longwall mining machines used in the mining industry require flexible cables and hoses, hereinafter referred to collectively as "flexible members". Longwall mining machines include a movable shearing machine and/or other equipment that is predominantly powered by electricity and water is used to control dust. The flexible members must be mobile to keep up with the mining progress or to haul or move the mined material. Therefore, flexible electrical cables and water hoses are required to provide power and give the equipment the versatility of moving within the mine and thus, there is a need for cable handling systems that protect the flexible members from the harsh conditions attributed to the mining and allow them to move along with the moving mining machine.

One method of protecting and controlling the cable and hose within the mine is a cable track system. The cable track system enables the machine to which the cable and hose are attached, to move in a forward direction and a reverse direction while protecting and controlling the cable and hose. A cable track system consists of a number of connected cable track links that form a chain with one end attached to a power source and the other end attached to the equipment being powered. The electrical cable and water hose are contained within the cable track links.

Typically, moving mining machines are integrated with systems that have conveyors to move the mined material. These systems include cable guides or cable handlers as the cable handling system. The cable guide allows the flexible members to be guided along the conveyor as the flexible members trail the moving mining machine during mining operations. The cable handler retains and protects the flexible members as the cable handler moves along with the moving mining machine during mining operations. The following patents are examples of cable guides and cable handlers developed for longwall mining: U.S. Pat. Nos. 3,367,718; 3,861,751; 3,997,039; 4,103,974; 4,119,348; 4,185,874; 4,391,471; 4,458,950; 4,483,567; 4,514,011; 4,545,621; and 4,564,261. The following patents are examples of cable handlers having a plurality of interlocking links configured to retain and protect the flexible member: U.S. Pat. Nos. 5,642,612 and 5,829,243.

Depending upon a particular loading strength needed from a cable track system, either a single pull system or a twin pull system can be employed. Thus, there is a need in the art for a cable track system that can be readily converted from a single pull cable track system to a twin pull cable track system. There is also a need in the art for a cable track system that can be readily converted to a combination of a single pull cable track system and a twin pull cable track system depending upon a particular required loading strength.

SUMMARY OF THE INVENTION

In accordance with an embodiment of the present invention, a convertible interlocking cable track system for receiving and handling a flexible member that can be converted from a single pull system to a twin pull system in order to meet certain loading requirements. The convertible interlocking cable track system includes a series of links adapted to retain the flexible member, each of the links including a single pull link adapted to interconnect with adjacent links wherein the single pull link is configured to cooperate with a cable control member to form an opening for receiving and handling the flexible member. The single pull link can be a U-shaped member having a first leg, a second leg, and a transverse portion connecting the first leg and the second leg. According to one configuration, the cable control member can comprise a shaped member to form a single pull cable track system. According to another configuration, the cable control member can comprise an outer link which, when associated with the single pull link, converts the single pull link to a twin pull link. The track system also includes a securing arrangement for securing the cable control member to the single pull link and an interlocking system for joining the series of links to one another.

The interlocking system can include an interlocking link associated with the transverse portion of the single pull link. The interlocking link includes a male portion having an aperture extending therethrough, and an opposed female portion, including a pair of apertures extending therethrough. The female portion can be configured to receive the male portion of an adjacently disposed interlocking link. Upon assembly, the pair of apertures of the female portion are configured to be aligned with the aperture of the adjacently disposed male portion. The interlocking system further includes a link bolt configured to extend through the aligned apertures and secure the adjacently disposed single pull links.

According to one configuration, the securing arrangement can include a locking pin configured for cooperation with the shaped rod to secure the shaped rod to the single pull link. One or more flexible members can then be retained and controlled within the opening formed by this arrangement.

According to another configuration, the securing arrangement can include a female cavity located within the single pull link configured for receiving a corresponding male extrusion extending from the outer link, an outer clamp bar configured for extending through a pair of apertures in the outer link, and a locking pin configured for cooperation with the outer clamp bar to secure the outer link and the outer clamp bar to the single pull link. The above described securing arrangement converts the single pull link to a twin pull link. Each of the single pull links in the track system can be converted in this manner, or only a predetermined number of single pull links can be converted to form a combination single pull/twin pull track system to meet certain loading requirements.

The single pull link and/or the outer link can include gussets to control the flexible member and to provide reinforcement to the series of links.

In accordance with another embodiment of the present invention a single pull interlocking cable track system for receiving and handling a flexible member includes a series of links adapted to retain the flexible member. The series of links include a single pull link comprising a U-shaped member having a first leg, a second leg, and a transverse portion connecting the first leg and the second leg. The single pull link is adapted to interconnect with adjacent single pull links. Each of the links further include a cable keeper configured for cooperation with the single pull link to form an opening for receiving and handling the flexible member and a locking pin configured for securing the cable keeper to the single pull link. The cable track system also includes an interlocking system for joining the series of links to one another.

The transverse portion of the single pull link can include an aperture extending therethrough configured to receive the locking pin. Each of the first leg and second leg of the single pull link can include a longitudinal groove extending therethrough, configured for receiving the cable keeper. According to one configuration, the cable keeper can be a U-shaped rod having a first arm and a second arm, and each of the first arm and second arm are configured for extending through the longitudinal groove in the first leg and second leg of the single pull link. The first arm and second arm of the cable keeper includes an aperture extending through an end portion thereof, and configured for receiving the locking pin as the locking pin extends through the aperture in the transverse portion of the single pull link to secure the cable keeper to the single pull link.

The interlocking system includes an interlocking link associated with the transverse portion of the single pull link. The interlocking link includes an elongated member having opposing ends and at least one aperture extending through the opposing ends thereof. At least one of the apertures is configured for alignment with at least one aperture of an interlocking link of an adjacently disposed single pull link. The interlocking system further includes a link bolt configured to extend through the aligned apertures to secure the adjacently disposed single pull links.

In certain configurations, the cable keeper can be replaced with an outer link and an outer clamp bar arrangement to convert one or more of the single pull links to a twin pull cable link to form either a twin pull cable track system or a combination single pull/twin pull cable track system.

In accordance with another embodiment of the present invention a twin pull interlocking cable track system for receiving and handling a flexible member includes a series of links adapted to retain the flexible member. Each of the links include a single pull link comprising a U-shaped member having a pair of legs and a transverse portion extending between the pair of legs. The single pull link is adapted to interconnect with adjacent single pull links. Each of the links further include an outer link adapted for cooperation with the legs of the single pull link to form an opening for receiving and handling the flexible member, an outer clamp bar configured for cooperation with the outer link and the single pull link, and a locking pin configured for cooperation with the single pull link to secure the outer link and the outer clamp bar to the single pull link. The cable track system further includes an interlocking system for joining the series of links to one another.

According to one design, the outer link can include a first pair and a second pair of gussets configured for alignment and cooperation with corresponding gussets in the pair of legs of the single pull link, a transverse portion extending between the first pair and second pair of gussets, and at least one male extrusion extending from the transverse portion configured for mating with a female cavity in the single pull link.

The interlocking system can include a first interlocking link associated with the transverse portion of the single pull link and a second interlocking link associated with the transverse portion of the outer link. Each of the first and second interlocking links can include an elongated member having opposing ends and at least one aperture extending through the opposing ends thereof. The apertures of the first and second interlocking links can be configured for alignment with apertures in first and second interlocking links of an adjacently disposed link and the interlocking system further includes a link bolt configured to extend through the aligned apertures to secure the adjacently disposed links.

In certain configurations, the outer clamp bar can include a U-shaped member having square corners and a first and second arm. The single pull link and the outer link can include a pair of longitudinal openings configured to receive the respective first and second arms of the outer clamp bar and opposing ends of the first and second arms include an aperture configured to receive the locking pin.

In accordance with another embodiment of the present invention, a method of converting a single pull cable track system to a twin pull cable track system for handling a flexible member includes providing a series of single pull links adapted to retain the flexible member, each of the single pull links comprising a first leg, a second leg, and a transverse portion extending between the first leg and second leg, wherein each of the single pull links are adapted to interconnect with adjacent single pull links. The method further includes providing a series of outer links, each of the outer links configured to cooperate with the legs of the single pull link to form an opening for receiving and handling the flexible member, aligning the series of outer links with a corresponding series of single pull links, providing a first opening/groove and a second opening/groove extending along a longitudinal axis through each of the aligned single pull links and outer links, providing an outer clamp bar having a first arm and a second arm, wherein the first arm and second arm include an aperture at an end portion thereof, inserting the first arm of the outer clamp bar in the first opening/groove and the second arm of the outer clamp bar in the second opening/groove, and inserting a locking pin through the single pull link and into the aperture of the first arm and second arm of the outer clamp bar to secure the outer link and the outer clamp bar to the single pull link.

Further details and advantages will be understood from the following description of the preferred embodiments, taken with the accompanying drawings, wherein like reference numerals represent like elements throughout.

DESCRIPTION OF THE PREFERRED EMBODIMENT

For purposes of the description hereinafter, the terms "upper", "lower", "right", "left", "vertical", "horizontal", "top", "bottom", "lateral", "longitudinal", and derivatives thereof, shall relate to the invention as it is oriented in the drawing figures. However, it is to be understood that the invention may assume various alternative variations except where expressly specified to the contrary. It is also to be understood that the specific devices illustrated in the attached drawings and described in the following specification, are simply exemplary embodiments of the invention. Hence, specific dimensions and other physical characteristics related to the embodiments disclosed herein are not to be considered as limiting.

Figure 2A:
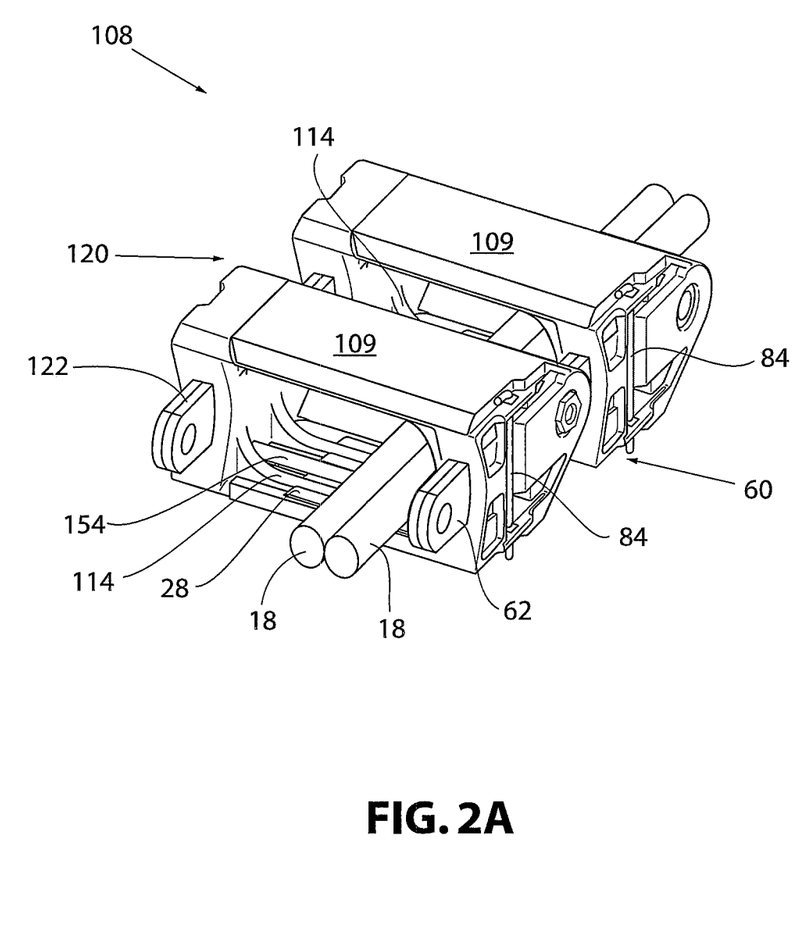
FIG. 2A is an isometric view of the pair of twin pull links of FIG. 2 in an assembled relationship including at least one flexible member in accordance with an embodiment of the present invention.
Figure 3A:
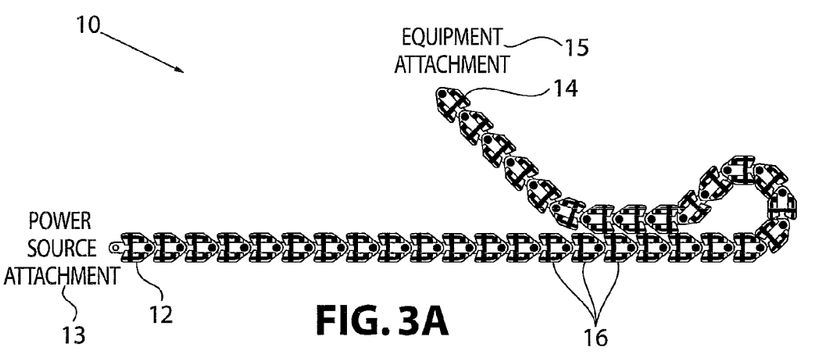
FIGS. 3A-3C are elevated schematic side views of a cable track system motion when the mining equipment is moving within the mine in accordance with an embodiment of the present invention.
Figure 3B:
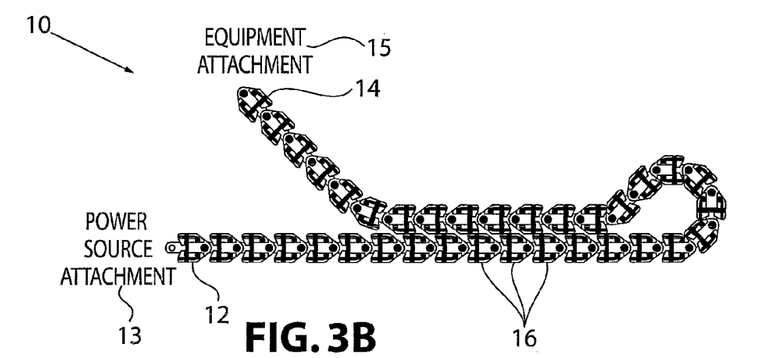
Figure 3C:
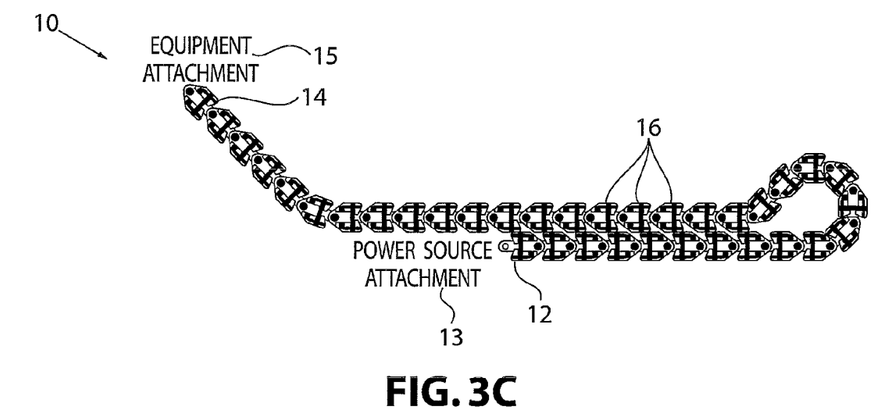

Reference is now made to FIGS. 3A-3C which depict the motion of an interlocking cable track system generally indicated as 10. The interlocking cable track system includes a series of interlocking links 16, 106 which are joined together to form a track having a first end 12 attached to a power source 13 and a second end 14 attached to the equipment being powered within the mine. The interlocking cable track system 10 is configured to receive and handle one or more flexible members, 18, as shown in FIGS. 1A and 2A, to enable the machine to which the flexible members 18 are attached, to move in a forward direction and in a reverse direction while protecting the flexible members 18 from the harsh conditions attributed to mining and controlling the movement of the flexible members 18. It can be appreciated that the flexible members 18 can include cables or hoses through which electrical power, water, and/or hydraulic fluid can be supplied to the equipment within the mine.

Figure 1:
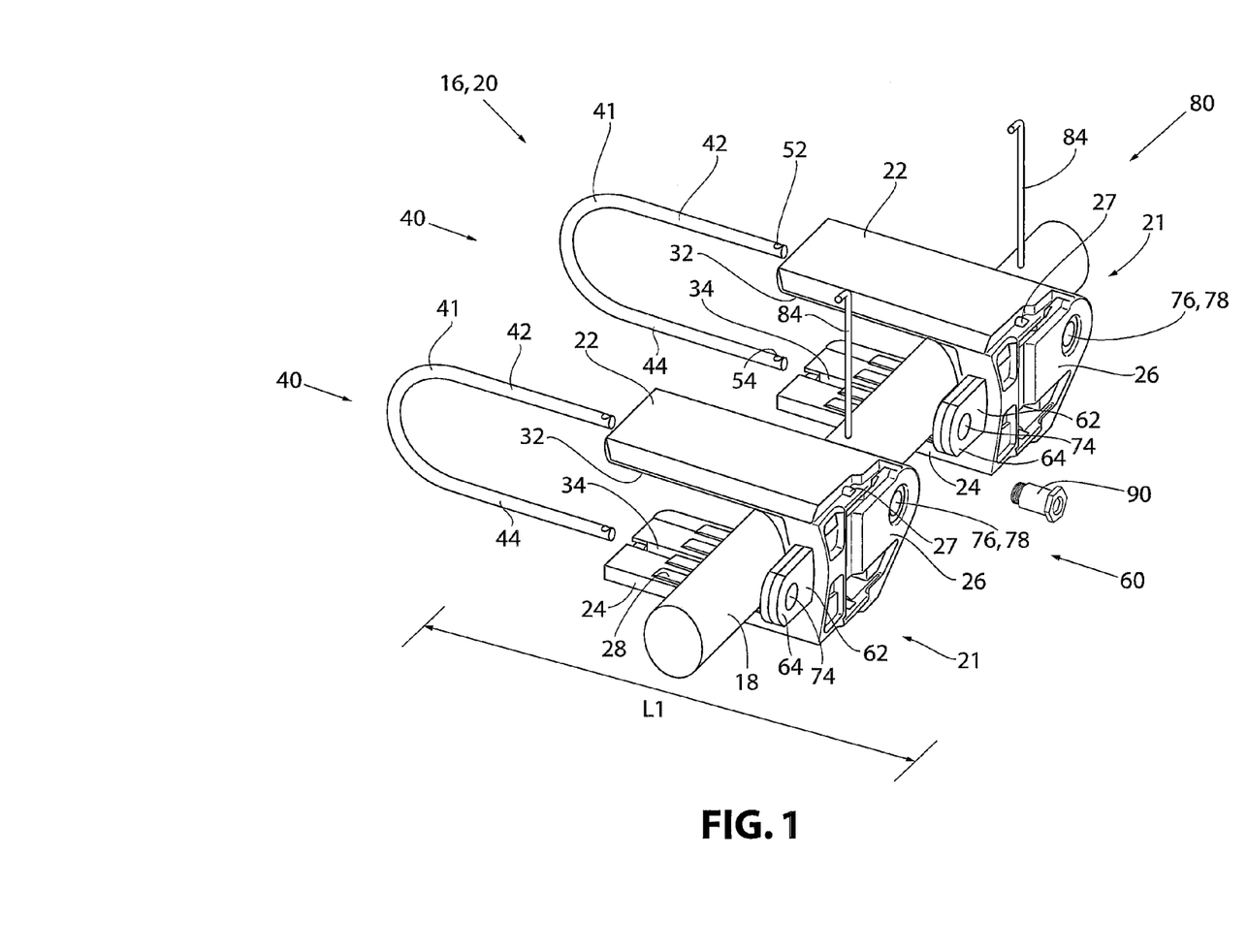
FIG. 1 is an isometric exploded view of a pair of single pull links utilized in a single pull cable track system in accordance with an embodiment of the present invention.
Figure 1A:
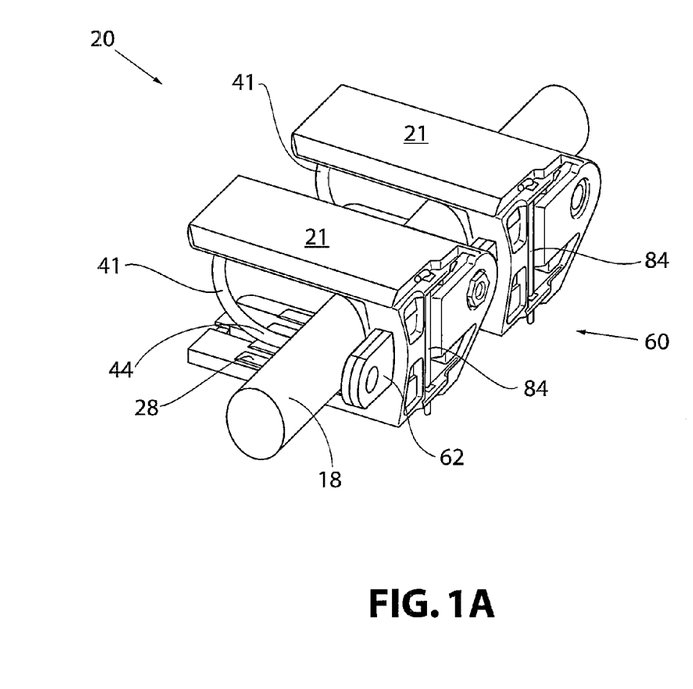
FIG. 1A is an isometric view of the pair of single pull links of FIG. 1 in an assembled relationship including a flexible member in accordance with an embodiment of the present invention.
Figure 2:
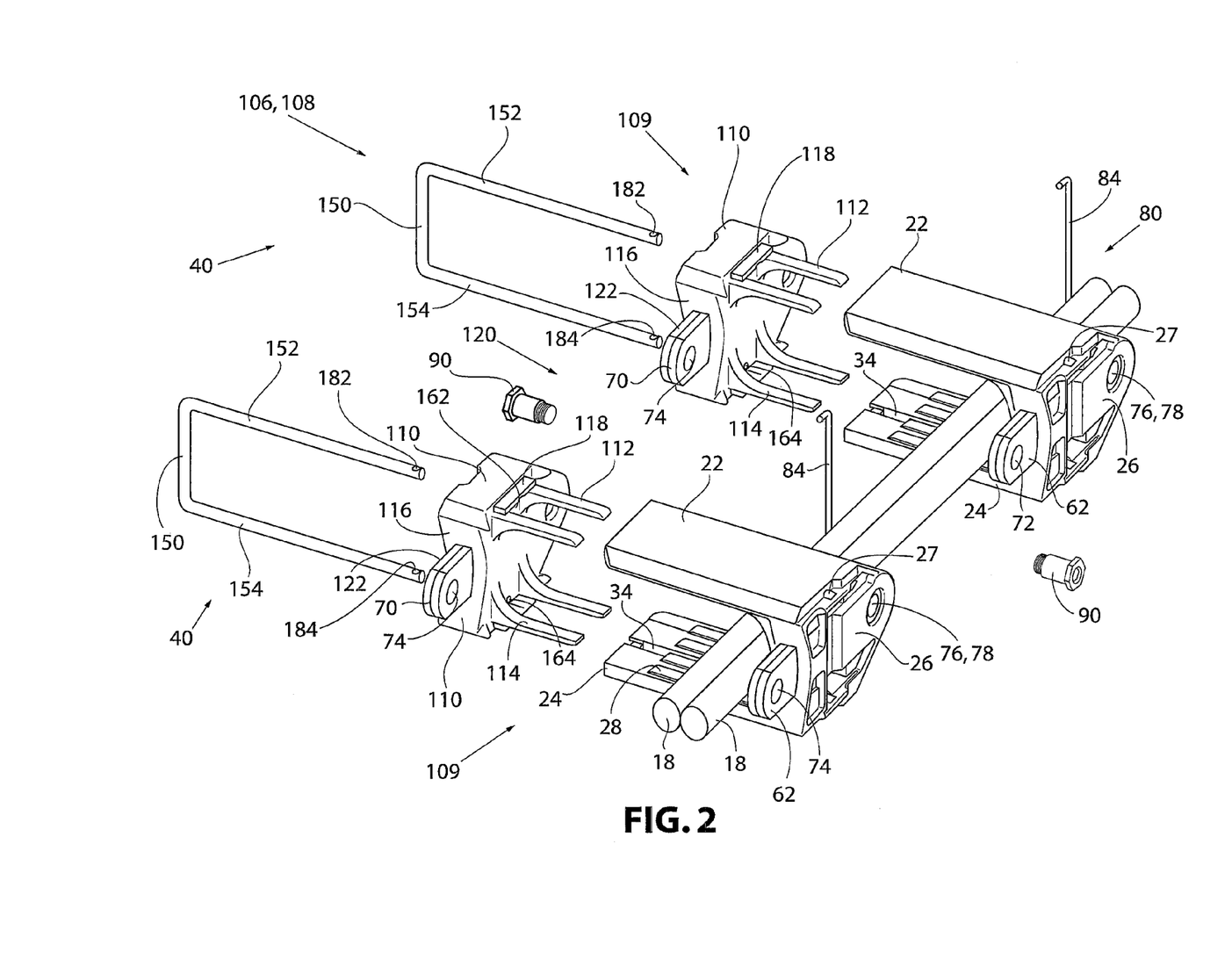
FIG. 2 is an isometric exploded view of a pair of twin pull links utilized in a twin pull cable track system in accordance with an embodiment of the present invention.

Reference is now made to FIGS. 1, 1A, and 4A-4B which shows a portion of a single pull interlocking cable track system, generally indicated as 20, in accordance with one embodiment for receiving and handling one or more flexible members 18. The interlocking cable track system can be converted from a single pull system, as shown in FIGS. 1 and 1A to a twin pull system, as shown in FIGS. 2 and 2A, or a combination of a single pull/twin, pull system in order to meet certain loading requirements.

Referring back to FIGS. 1 and 1A, the interlocking cable track system for receiving and handling a flexible member 18 includes a series of links 16 adapted to retain the flexible member 18. The series of links 16 include a series of single pull links, generally indicated as 21. Each of the single pull links 21 can be a U-shaped member having a first leg 22, a second leg 24, and a transverse portion 26, connecting the first leg 22 and the second leg 24. The single pull link 21 can be formed from any known material including polymeric material, reinforced composites, metal, ceramics, and the like, as long as the material selected has sufficient strength to withstand the harsh conditions within a longwall mining operation.

The single pull link 21 is adapted to interconnect with adjacently disposed single pull links 21. Each of the single pull links 21 further include a cable control member, generally indicated as 40, which can be in the form of a cable keeper 41, configured for cooperation with the single pull link 21 to form an opening as shown in FIG. 1A for receiving and handling the flexible member 18 and a securing arrangement, generally indicated as 80, including a locking pin 84 configured for securing the cable keeper 41 to the single pull link 21. The cable track system also includes an interlocking system, generally indicated as 60, for joining the series of links 16 to one another.

With continuing reference to FIGS. 1 and 1A, the transverse portion 26 of the single pull link 21 can include an aperture 27 extending therethrough, configured to receive the locking pin 84. Each of the first leg 22 and second leg 24 of the single pull link 21, can include a first groove 32 and a second groove 34, extending along a longitudinal length "L1" of the first leg 22 and second leg 24, respectively. This first groove 32 and second groove 34 are configured to receive the cable keeper 41. According to one configuration as particularly shown in FIG. 6B, the cable keeper 41 can be a U-shaped rod having a first arm 42 and a second arm 44, and each of the first arm 42 and second arm 44 are configured for extending through the respective first longitudinally extending groove 32 in the first leg 22 and the second longitudinally extending groove 34 in the second leg 24 of the single pull link 21. A pair of molded stops 36 can be provided in the transverse portion 26 of the single pull link 21 to cooperate with the first arm 42 and second arm 44 of the cable keeper 41. The first arm 42 and second arm 44 of the cable keeper 41 each include an aperture, or a first opening 52 and a second opening 54, extending through an end portion thereof and configured for receiving the locking pin 84, as the locking pin 84 extends through the aperture 27 in the transverse portion 26 of the single pull link 21 to secure the cable keeper 41 to the single pull link 21. The locking pin 84 is shown in detail in FIG. 6C and has the form of an elongated cylindrical body 86 having a first end 87 that extends into the aperture 27 and a second end 88 that is bent to lock it in place. According to one embodiment, the locking pin 84 can be formed from steel, but it can be appreciated that this locking pin 84 can be formed from any well-known material having sufficient strength to secure the cable keeper 41 to the single pull link 21.

Figures 4A, 4B, 4C:
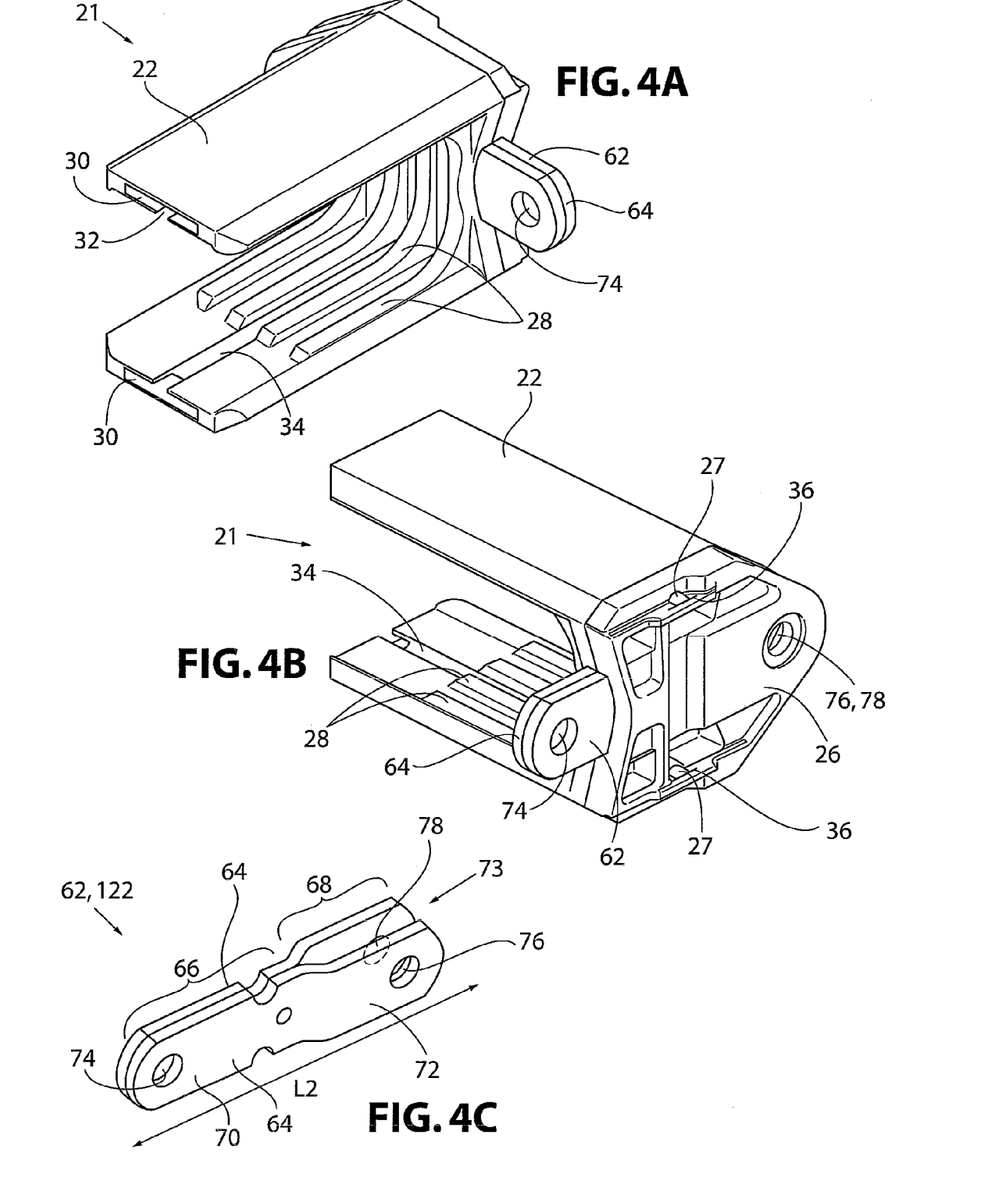
FIG. 4A is a front isometric view of one of the single pull cable links of FIG. 1 in accordance with an embodiment of the present invention.
FIG. 4B is a back isometric view of one of the single pull cable links of FIG. 1 in accordance with an embodiment of the present invention.
FIG. 4C is an isometric view of an interlocking link for securing adjacent links together in accordance with an embodiment of the present invention.

Referring again to FIGS. 1, 1A and 4A-4B, the interlocking system includes an interlocking link 62, as shown in detail in FIG. 4C, associated with the transverse portion 26 of the single pull link 21. According to one embodiment, the interlocking link 62 will have the capability of withstanding up to approximately 10,000 pounds of pull force. The interlocking link 62 includes an elongated member 64 having opposing ends, such as a male end 70 and a female end 72 and at least one aperture 74, 76, and 78 extending through the opposing ends 70, 72 thereof. As particularly shown in FIG. 4C, the interlocking link 62 can comprise a pair of elongated members 64 in the form of a "Y" shape, wherein at least a first portion 66 of the pair of elongated members 64 are positioned flush against each other, along a longitudinal axis "L2" of the elongated members 64. According to one embodiment, the pair of elongated members 64 are welded together to form the male end 70. A second portion, as shown at 68, of the pair of elongated members 64, extends away from each other to the female end 72. The female end 72 has an opening, generally indicated as 73, which can accommodate the male end 70 of an adjacently disposed interlocking link 62 associated with an adjacently disposed single pull link 21, as shown in FIGS. 1 and 1A. The male end 70 and female end 72 of interlocking link 62 extend beyond the transverse portion 26 of the single pull link 21. According to one embodiment, the interlocking link can be formed from steel and coated with cadmium to minimize corrosion.

As discussed above, the male end 70 and female end 72 include apertures 74, 76, and 78 that are configured for alignment with apertures of an interlocking link 62 of an adjacently disposed single pull link 21. In particular, the male end 70 can include a clearance aperture or a "male" clearance aperture 74 and the female end 72 can include both a clearance aperture or a "female" clearance aperture 76 and a threaded aperture of a "female" threaded aperture 78. The interlocking system 60 further includes a link bolt 90 configured to extend through the aligned apertures 74, 76, and 78 to secure the adjacently disposed single pull links 21. It can be appreciated that the link bolt 90 is configured to cooperate with the apertures 74, 76 and 78 to form a pivotal attachment of the single pull links 21 to enable the single pull links 21 to pivotably move within the mine during forward and reverse motion of the cable track system 10.

It can be appreciated that the interlocking link 62 can be a separately manufactured member that fits within an apertured opening, configured to receive the interlocking link in the transverse portion 26 of the single pull link 21, as shown FIGS. 1, 1A and 4A-4B. Alternatively, the interlocking link 62 can be integrally formed with the transverse portion 26 of the single pull link 21, including a male end 70 and a female end 72 having a male lug having a single hole and a female lug having a pair of holes for receiving the fastener or bolt.

Figure 6A:
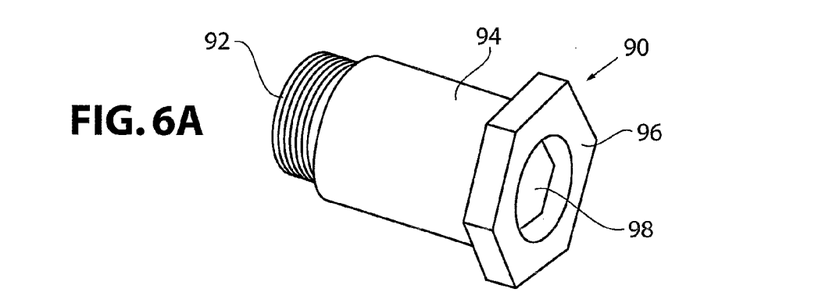
FIG. 6A is an isometric view of a link bolt for use with the interlocking cable track system in accordance with an embodiment of the present invention.

With particular reference to FIG. 6A, the link bolt 90 can be constructed of machined steel. The link bolt 90 can include a threaded portion 92 that will match the threads in the female threaded aperture 78 of the interlocking link 62. The link bolt 90 can include a body portion 94 that will allow clearance with the male and female clearance apertures 74 and 76, respectively. The link bolt 90 can include a head in the form of a standard hex head 96. The hex head 96 can include a hex hole 98 in the outside center portion to enable the use of a hex key wrench, as is known in the art.

Referring again to FIGS. 1, 1A and 4A-4B, the single pull link 21 can be molded to provide protection to the flexible member 18 on an inside surface of the transverse portion 26, as well as, along an inside surface of the first leg 22 and an inside surface of the second leg 24. According to one embodiment, the single pull link 21 can include gussets 28 extending from an inside surface of the first leg 22 to the inside surface of the second leg 24 to control the flexible member and to provide reinforcement to each of the single pull links 21.

In certain configurations, the cable keeper 41 can be replaced with an outer link 110, as shown in FIGS. 2 and 2A, and an outer clamp bar arrangement 150 to convert one or more of the single pull links 21 to a twin pull cable link, generally indicated as 109 in FIG. 2A, to form either a twin pull cable track system or a combination single pull/twin, pull cable track system. The twin pull cable link 109, a series of which can be interlocked together to form a twin pull cable track system 108, is shown in FIGS. 2, 2A and 5A-5B and is discussed in further detail below.

Reference is now made to FIGS. 2 and 2A which show a portion of a twin pull interlocking cable track system, generally indicated as 108, in accordance with one embodiment for receiving and handling one or more flexible members 18. The twin pull interlocking cable track system 108 includes a series of links 106 adapted to retain the flexible member 18. The series of links 106 include a series of twin pull links, generally indicated as 109. Each of the twin pull links 109 include a single pull link 21. The single pull link 21 can be of the same design as discussed in detail above and shown in FIGS. 1, 1A and 4A-4B. In particular, the single pull link 21 can be a U-shaped member having a pair of legs, such as a first leg 22 and a second leg 24, and a transverse portion 26 extending between the pair of legs 22, 24. The single pull link 21 is adapted to interconnect with adjacent single pull links 21, also as discussed above. Each of the twin pull links 109 further include a cable control member 40, which can be in the form of an outer link 110, adapted for cooperation with the respective first leg 22 and second leg 24 of the single pull link 21 to form an opening for receiving and handling the flexible member 18. An outer clamp bar 150, as shown in detail in FIG. 6D, can be provided which is configured for cooperation with the outer link 110 and the single pull link 21. A securing arrangement 80 including a locking pin 84, as discussed above and shown in detail in FIG. 6C, is provided which is configured for cooperation with the single pull link 21 to secure the outer link 110 and the outer clamp bar 150 to the single pull link 21. The cable track system further includes an interlocking system 60, 120 for joining the series of twin pull links 109 to one another.

Figure 5A:
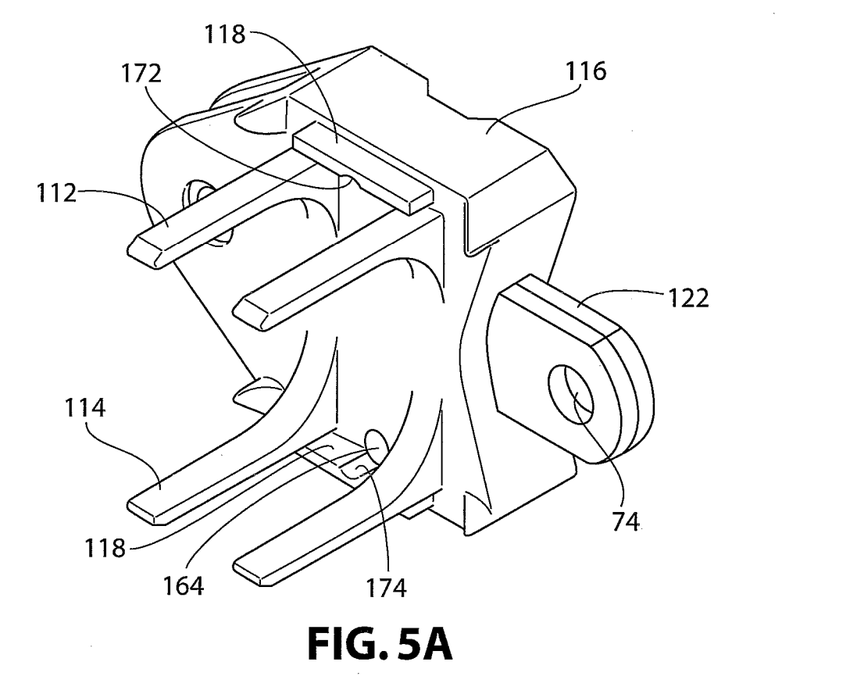
FIG. 5A is a front isometric view of one of the twin pull cable links of FIG. 2 in accordance with an embodiment of the present invention.
Figure 5B:
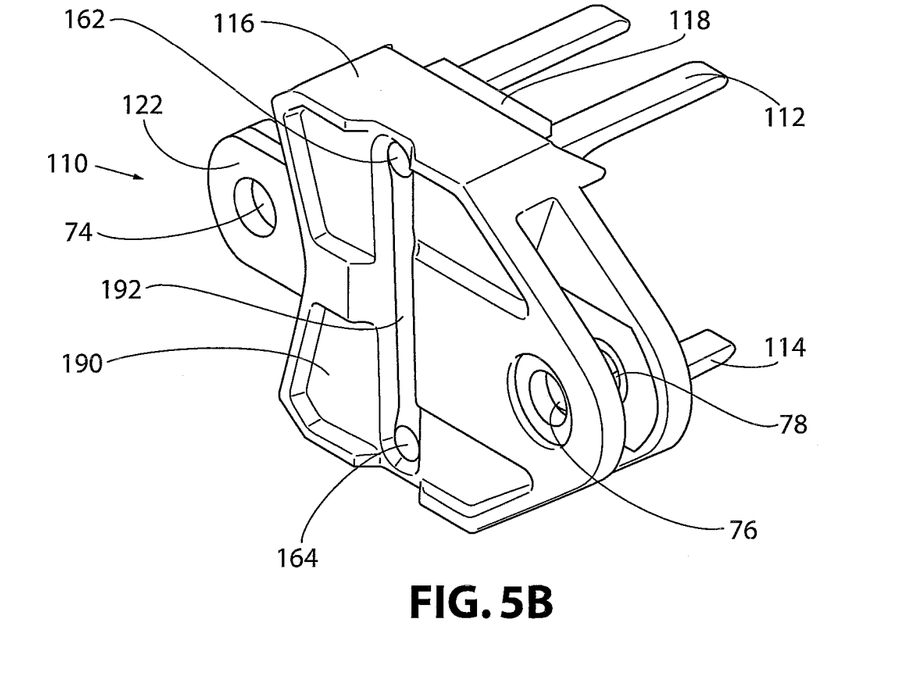
FIG. 5B is a back isometric view of one of the twin pull cable links of FIG. 2 in accordance with an embodiment of the present invention.

With continuing reference to FIGS. 2 and 2A and with reference to FIGS. 5A-5B, the outer link 110 can include a first pair 112 and a second pair 114 of gussets configured for alignment with, and cooperation with, corresponding gussets 28 in the pair of legs 22, 24 of the single pull link 21. According to one embodiment, the first pair and second pair 112, 114 of gussets can be triangular in shape near the top and bottom of the outer link 110 which are configured to match and interlock with cavities created by gussets 28 in the pair of legs 22, 24 of the single pull link 21. These triangular shaped gussets 112, 114 will also act to control the cable.

The outer link 110 can include a transverse portion 116 extending between the first pair 112 and second pair 114 of gussets, and at least one male extrusion 118 or molded portion extending from the transverse portion 116. The male extrusion 118 is configured for mating with a female cavity 30 or slot in the single pull link 21, as particularly shown in FIG. 4A.

The interlocking system 60, 120 can include an interlocking link 62, such as shown in FIG. 4C and discussed in detail above. For clarity purposes, when describing the twin pull system, this interlocking link 62 will be referred to as a "first" interlocking link 62. The first interlocking link 62 is associated with the transverse portion 26 of the single pull link 21. A second interlocking link 122 is associated with the transverse portion 116 of the outer link 110. Each of the first and second interlocking links 62, 122 can have the same structure as discussed above in relation to FIG. 4C and can include a pair of elongated members 64 having a male end 70 and a female end 72 and a series of apertures 74, 76, and 78 at opposing ends thereof which can be aligned to secure the adjacent links 106 together. The female end 72 includes an opening 73 configured to receive a male end 70 of an adjacently disposed second interlocking link 122 associated with an adjacently disposed outer link 110. A link bolt 90 as discussed above, is configured to extend through the aligned apertures 74, 76, and 78 to secure the adjacently disposed links 106.

Figures 6B, 6C, 6D:
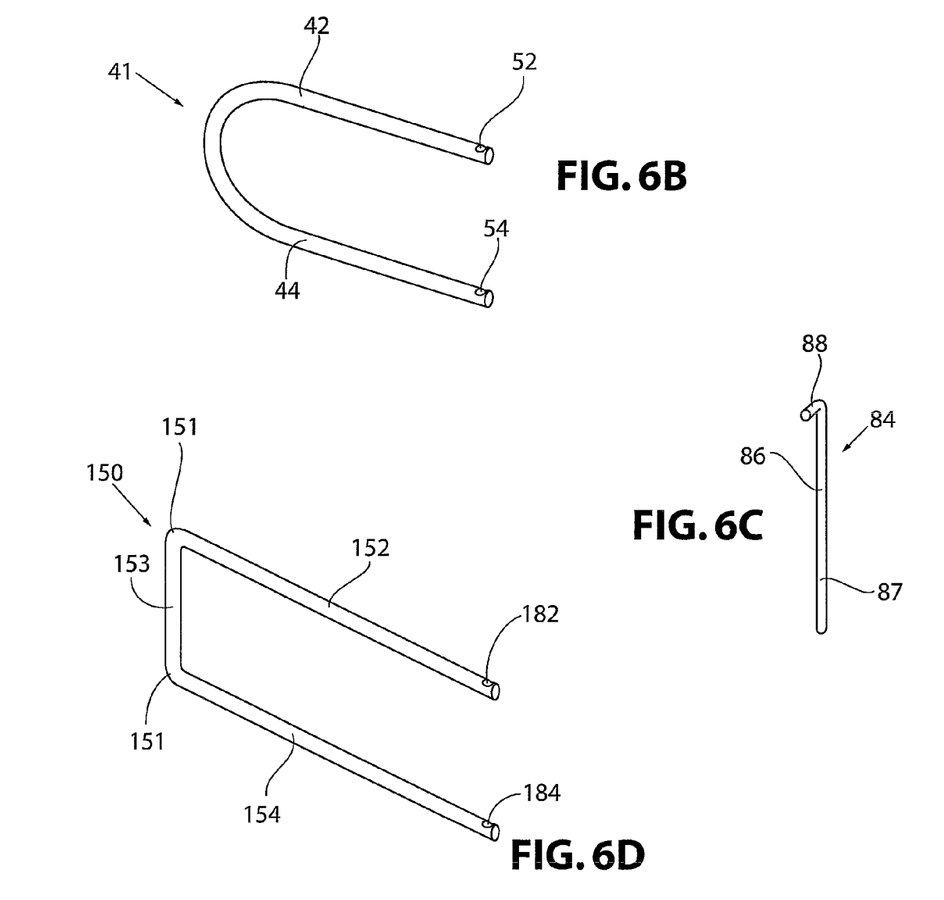
FIG. 6B is an isometric view of a cable keeper configured to cooperate with a single pull link for use with the interlocking cable track system in accordance with an embodiment of the present invention.
FIG. 6C is an isometric view of clamp locking pin for use with the interlocking cable track system in accordance with an embodiment of the present invention.
FIG. 6D is an isometric view of an outer clamp bar configured to cooperate with a twin pull link for use with the interlocking cable track system in accordance with an embodiment of the present invention.

As shown in FIG. 6D, the outer clamp bar 150 can include a U-shaped member having square corners 151, a first arm 152 and second arm 154. According to one embodiment, the outer clamp bar 150 can be a TPI® Clamp Bar, however, any known type of clamp bar can be used for the outer clamp bar. The first arm 152 and second arm 154 of the outer clamp bar 150 includes a body portion 155 extending therebetween.

Referring back to FIGS. 5A-5B, the outer link 110 can include a first opening 162, a second opening 164, and the male extrusion 118 can include corresponding first and second grooves 172, 174 configured to receive the respective first and second arms 152, 154 of the outer clamp bar 150. The first and second openings 162, 164 and the first and second grooves 172, 174 are positioned in alignment with the first and second grooves 32, 34 of the single pull link 21, so as to receive the first and second arms 152, 154 of the outer clamp bar 150. Opposing ends of the first arm 152 and second arm 154 include an aperture 182, 184 configured to receive the locking pin 84. A pair of molded stops 36 can be provided in the transverse portion 26 of the single pull link 21 to cooperate with the first arm 152 and second arm 154 of the outer clamp bar 150.

With particular reference to FIG. 5B, an outer surface 190 of the transverse portion 116 of the outer link 110 can include a grooved portion 192. This grooved portion 192 is configured to receive the body portion 155 of the outer clamp bar 150. This grooved portion 192 prevents the outer clamp bar 150 from extending beyond the outer surface 190 of the outer link 110.

As discussed above, the interlocking cable track system 10 of the present invention can be readily converted from a single pull track system 20, as shown in FIGS. 1 and 1A to a twin pull track system 108 by replacing the cable control element 40, in the form of the cable keeper 41, that cooperates with the single pull link 21, with the outer link 110 and an outer clamp bar 150. The present invention also allows for the conversion of a predetermined number of single pull links 21 to twin pull links 109 so as to produce an interlocking cable track system having a combination of single pull links 21 and twin pull links 109 depending upon certain loading requirements.

Referring again to FIGS. 1, 1A, 2, and 2A, in accordance with another embodiment of the present invention, a method of converting a single pull cable track system 20 to a twin pull cable track system 108 for handling a flexible member 18, includes providing a series of single pull links 21 adapted to retain the flexible member 18, each of the single pull links 21 include a first leg 22, a second leg 24, and a transverse portion 26 extending between the first leg 22 and second leg 24, wherein each of the single pull links 21 are adapted to interconnect with adjacent single pull links 21. The method further includes providing a series of outer links 110, each of the outer links 110 configured to cooperate with the legs 22, 24 of the single pull link 21 to form an opening for receiving and handling the flexible member 18, aligning the series of outer links 110 with a corresponding series of single pull links 21, providing a first opening/groove 32, 162, 172 and a second opening/groove 34, 164, 174 extending along a longitudinal axis "L1" through each of the aligned single pull links 21 and outer links 110, providing an outer clamp bar 150 having a first arm 152 and a second arm 154, wherein each of the first arm 152 and second arm 154 include an aperture 182, 184 at an end portion thereof, inserting the first arm 152 of the outer clamp bar 150 in the first opening/groove 32, 162, 172 and the second arm 154 of the outer clamp bar 150 in the second groove 34, 164, 174 and inserting a locking pin 84 through the single pull link 21 and into the apertures 182, 184 of the first arm 152 and second arm 154 of the outer clamp bar 150 to secure the outer link 110 and the outer clamp bar 150 to the single pull link 21.

It can be appreciated that each of the embodiments disclosed above result in an interlocking cable track system formed from a series of single, twin, and/or a combination of single and twin interlocking links which meet a specific loading requirement for receiving and handling a flexible member within a longwall mining operation.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention.

The invention claimed is:

1. A convertible interlocking cable track system for receiving and handling a flexible member, said convertible interlocking cable track system comprising:
   (a) a series of links adapted to retain the flexible member, each of said links including a single pull link adapted to interconnect with adjacent links, wherein the single pull link is configured to cooperate with a cable control member to form an opening for enclosing and handling the flexible member, wherein the cable control member comprises either a shaped member to form a single pull cable track system or an outer link to convert the single pull link to a twin pull link cable track system, the single pull link including structure configured to cooperate with the shaped member and the outer link to convert the cable track system between a single and twin pull link cable track system
   (b) a securing arrangement for securing the cable control member to the single pull link; and
   (c) an interlocking system for joining the series of links to one another.

2. The convertible interlocking cable track system of claim 1, wherein the single pull link comprises a U-shaped member having a first leg, a second leg, and a transverse portion connecting the first leg and the second leg.

3. The convertible interlocking cable track system of claim 2, wherein the interlocking system comprises an interlocking link associated with the transverse portion of the single pull link, said interlocking link comprising a male portion having an aperture extending therethrough, and an opposed female portion including a pair of apertures extending therethrough, and wherein the female portion is configured for receiving the male portion of an adjacently disposed interlocking link.

4. The convertible interlocking cable track system of claim 3, wherein said pair of apertures of said female portion, are configured to be aligned with said aperture of said adjacently disposed male portion and wherein said interlocking system further includes a link bolt configured to extend through the aligned apertures and secure the adjacently disposed single pull links.

5. The convertible interlocking cable track system of claim 1, wherein the securing arrangement comprises a locking pin configured for cooperation with the shaped member to secure the shaped member to the single pull link.

6. The convertible interlocking cable track system of claim 1, wherein the securing arrangement comprises a female cavity located within the single pull link configured for receiving a corresponding male extrusion extending from said outer link, an outer clamp bar configured for extending through a pair of apertures in said outer link, and a locking pin configured for cooperation with the outer clamp bar to secure the outer link and the outer clamp bar to the single pull link.

7. The convertible interlocking cable track system of claim 1, wherein the single pull link and/or the outer link includes gussets to control the flexible member and to provide reinforcement to the series of links.

8. The convertible interlocking cable track system of claim 1, wherein the series of links can form a single pull link cable track system, a twin pull link cable track system, or a combination of single pull/twin pull link cable track system.

9. The convertible interlocking cable track system of claim 1, wherein the structure of the single pull link configured to cooperate with the shaped member comprises grooves defined in the single pull link and the structure configured to cooperate with the outer link member comprises cavities defined by gussets on the single pull link.

10. The convertible interlocking cable track system of claim 1, wherein the securing arrangement is configured to cooperate with both the shaped member and the outer link.

11. A single pull interlocking cable track system for receiving and handling a flexible member, said interlocking cable track system comprising:
(a) a series of links adapted to retain the flexible member, each of said links including:
(i) a single pull link comprising a U-shaped member having a first leg, a second leg, and a transverse portion connecting the first leg and the second leg, said single pull link adapted to interconnect with adjacent single pull links;
(ii) a cable keeper configured for cooperation with the single pull link to form an opening for receiving and handling the flexible member; and
(iii) a locking pin configured for securing the cable keeper to the single pull link; and
(b) an interlocking system for joining the series of links to one another.

12. The single pull interlocking cable track system of claim 11, wherein the transverse portion of the single pull link includes an aperture extending therethrough, configured to receive the locking pin.

13. The single pull interlocking cable track system of claim 11, wherein each of the first leg and second leg of the single pull link includes a longitudinal groove extending therethrough, configured for receiving the cable keeper.

14. The single pull interlocking cable track system of claim 11, wherein the cable keeper comprises a U-shaped rod having a first arm and a second arm, each of said first arm and second arm configured for extending through the longitudinal groove in the first leg and second leg of the single pull link, the first arm and second arm of the cable keeper including an aperture extending through an end portion thereof, and configured for receiving the locking pin to secure the cable keeper to the single pull link.

15. The single pull interlocking cable track system of claim 11, wherein the interlocking system comprises an interlocking link associated with the transverse portion of the single pull link, said interlocking link comprising an elongated member having opposing ends and at least one aperture extending through the opposing ends thereof, at least one of said apertures being configured for alignment with at least one aperture of an interlocking link of an adjacently disposed single pull link, and wherein the interlocking system further comprises a link bolt configured to extend through the aligned apertures to secure the adjacently disposed single pull links.

16. The single pull interlocking cable track system of claim 11, wherein the cable keeper can be replaced with an outer link and an outer clamp bar arrangement to convert one or more of the single pull links to a twin pull cable link to form either a twin pull cable track system or a combination single pull/twin pull cable track system.

17. A twin pull interlocking cable track system for receiving and handling a flexible member, said interlocking cable track system comprising:
(a) a series of links adapted to retain the flexible member, each of said links including;
(i) a single pull link comprising a U-shaped member having a pair of legs and a transverse portion extending between said pair of legs, said single pull link adapted to interconnect with adjacent single pull links;
(ii) an outer link adapted for cooperation with the legs of the single pull link to form an opening for receiving and handling the flexible member;
(iii) an outer clamp bar configured for cooperation with the outer link and the single pull link; and
(iv) a locking pin configured for cooperation with the single pull link to secure the outer link and the outer clamp bar to the single pull link; and
(b) an interlocking system for joining the series of links to one another.

18. The twin pull interlocking cable track system of claim 17, wherein the outer link comprises a U-shaped member having a first pair and a second pair of gussets configured for alignment with, and cooperation with, corresponding gussets in said pair of legs of the single pull link, a transverse portion extending between the first pair and second pair of gussets, and at least one male extrusion extending from the transverse portion configured for mating with a female cavity in the single pull link.

19. The twin pull interlocking cable track system of claim 18, wherein the interlocking system comprises a first interlocking link associated with the transverse portion of the single pull link and a second interlocking link associated with the transverse portion of the outer link, each of said first and second interlocking links comprising an elongated member having opposing ends and at least one aperture extending through the opposing ends thereof.

20. The twin pull interlocking cable track system of claim 19, wherein the apertures of the first and second interlocking links are configured for alignment with apertures in the first and second interlocking links of an adjacently disposed link and the interlocking system further comprises a link bolt configured to extend through the aligned apertures to secure the adjacently disposed links.

21. The twin pull interlocking cable track system of claim 17, wherein the outer clamp bar comprises a U-shaped member having square corners and a first and second arm, and wherein the single pull link and the outer link include a pair of longitudinal openings configured to receive the respective first and second arms of the outer clamp bar, and wherein opposing ends of the first and second arms include an aperture configured to receive the locking pin.

22. A method of converting a single pull cable track system to a twin pull cable track system for handling a flexible member, said method comprising:
(a) providing a series of single pull links adapted to retain the flexible member, each of said single pull links comprising a first leg, a second leg, and a transverse portion extending between the first leg and second leg wherein each of said single pull links are adapted to interconnect with adjacent single pull links;

(b) providing a series of outer links, each of said outer links configured to cooperate with the legs of the single pull link to form an opening for receiving and handling the flexible member;
(c) aligning the series of outer links with a corresponding series of single pull links;
(d) providing a first groove and a second groove extending along a longitudinal axis through each of the aligned single pull links and outer links;
(e) providing an outer clamp bar having a first arm and a second arm, said first arm and second arm including an aperture at an end portion;
(f) inserting the first arm of the outer clamp bar in the first grooves and the second arm of the outer clamp bar in the second grooves; and
(g) inserting a locking pin through the single pull link and into the aperture of the first arm and second arm of the outer clamp bar to secure the outer link and the outer clamp bar to the single pull link.

* * * * *